United States Patent
Rolland

(10) Patent No.: US 8,930,928 B2
(45) Date of Patent: Jan. 6, 2015

(54) METHOD FOR MODIFYING THE ASSEMBLY OUTPUT OF A COMPILER

(75) Inventor: Morten Rolland, Oslo (NO)

(73) Assignee: Opera Software ASA, Oslo (NO)

( * ) Notice: Subject to any disclaimer, the term of this patent is extended or adjusted under 35 U.S.C. 154(b) by 830 days.

(21) Appl. No.: 12/650,743

(22) Filed: Dec. 31, 2009

(65) Prior Publication Data

US 2010/0229163 A1 Sep. 9, 2010

Related U.S. Application Data

(60) Provisional application No. 61/141,881, filed on Dec. 31, 2008.

(51) Int. Cl.
*G06F 9/45* (2006.01)

(52) U.S. Cl.
CPC ........................................ *G06F 8/52* (2013.01)
USPC ............ 717/159; 717/136; 717/140; 717/151

(58) Field of Classification Search
CPC ........ G06F 8/443; G06F 8/445; G06F 13/376
USPC .................................. 717/159, 136, 140, 151
See application file for complete search history.

(56) References Cited

U.S. PATENT DOCUMENTS

| | | | | |
|---|---|---|---|---|
| 6,151,708 A * | 11/2000 | Pedrizetti et al. | ............. | 717/173 |
| 6,789,255 B1 * | 9/2004 | Pedrizetti et al. | ............. | 717/169 |
| 7,430,670 B1 * | 9/2008 | Horning et al. | ............... | 713/190 |
| 8,108,641 B2 * | 1/2012 | Goss et al. | ..................... | 711/163 |
| 8,700,533 B2 * | 4/2014 | Levin et al. | ..................... | 705/59 |
| 2004/0243988 A1 * | 12/2004 | Ota | ............................. | 717/151 |
| 2004/0255268 A1 * | 12/2004 | Meijer et al. | .................. | 717/106 |
| 2006/0130021 A1 * | 6/2006 | Plum et al. | ..................... | 717/140 |
| 2006/0161878 A1 * | 7/2006 | Koh et al. | ..................... | 717/100 |

* cited by examiner

*Primary Examiner* — Zachary K Huson
*Assistant Examiner* — Getente A Yimer
(74) *Attorney, Agent, or Firm* — Birch, Stewart, Kolasch & Birch, LLP

(57) ABSTRACT

The present invention performs manipulations on the assembly file level. As a compiler outputs an assembly file, the assembly file may be inspected and modified before it is sent to the assembler. One or more of the following modifications may be made to the assembly file: rewrite certain symbols, scramble program symbols, reorganize declarations of global variables so that their layout and default values are known prior to linking, and identify initializer and de-initializer functions in order to make them callable through central initialization and de-initialization functions, respectively.

20 Claims, 7 Drawing Sheets

METHOD FOR MODIFYING THE ASSEMBLY OUTPUT OF A COMPILER

CROSS-REFERENCE

This non-provisional application claims priority under 35 U.S.C. §119(e) on U.S. Provisional Application No. 61/141,881, filed Dec. 31, 2008, the entire contents of which are incorporated herein by reference into the present application.

FIELD OF THE INVENTION

The present invention is directed to a tool for making specialized changes to the assembly output of the compiler, before running the assembler, to achieve a desired behavior that is not otherwise easily achievable.

BACKGROUND

A software library generally consists of a collection of subroutines or classes, and contains code and data that provide services to independent application programs. This allows for the data and code to be shared and updated in a modular fashion. A library may be statically linked to a target application, i.e., copied into the application program at compile time. Alternatively, a library may be dynamically linked, meaning that its functions and subroutines is loaded into the application program at the time of loading or executing the application in the underlying system.

The underlying operating system generally contains the necessary linking code (sometimes called a "loader") to link in the library at the appropriate time. In addition to loading the library from disk to the application program, the loader is also designed to perform memory management functions for adding relevant data from the library into memory. Furthermore, the library generally must rely upon system software (e.g., standard system libraries) to initialize its global variables and global objects during the standard startup procedure of the relevant application, and de-initialize them during the standard shutdown procedure of the application (this is a process generally known as "bootstrapping" the linked application).

As such, existing libraries cannot govern the initialization and de-initialization of their own global variables and objects. Thus, even if the controlling application program is done using the library's global variables/objects, the library cannot effectively release its global variables/objects even when they are no longer needed. It would be advantageous to allow the library to effectively control initialization and de-initialization of its own global variables/objects.

For complete applications which are not delivered as a library or libraries, a similar problem exists. I.e., existing applications cannot control the initialization and de-initialization of their own global variables and objects at will; instead the operating system which loads the applications is also responsible for controlling such initialization and de-initialization of the global variables/objects.

Another problem with existing libraries and applications is that various proprietary information of the software developer (e.g., names of functions, variables, and object classes) is open to inspection by others (e.g., customers). It would be advantageous to scramble various symbols in the library code in an effort to protect such proprietary information. Furthermore, in a library or application, a conflict may arise when a variable or object of the same name is used by another library or application loaded in the same system. Thus, it would be advantageous to rename certain symbols in order to avoid such conflicts in the underlying system.

SUMMARY OF THE INVENTION

The present invention relates to a method, system, and computer program for modifying software at the assembly file level. Particularly, an assembly file may be modified by either rewriting one or more symbols in the code; scrambling one or more symbols in the code related to the name of a function, variable, or object class; and/or removing the declaration of one or more global variables for insertion into another assembly file.

According to an exemplary embodiment, a symbol representing a memory management function in the relevant assembly syntax is rewritten, such that the rewritten symbol represents a memory management function to be specifically implemented by the library. This allows the library to use its own management function, e.g., instead of a memory management function provided by the operating system or the application or a support library.

According to another exemplary embodiment, a symbol is scrambled using a cryptographic hash, in an effort to hide the meaning of the symbol. A log file may be kept to correlate the scrambled symbol to its original unscrambled form.

According to another exemplary embodiment, the declaration of one or more global variables may be moved from the assembly file, and other assembly files of the same library, to be inserted in a global data assembly file. This allows the declarations of global variables to be co-located in a single assembly file and be assembled in such a way that the library can control their initialization.

According to another exemplary embodiment, initializer functions may be identified from the assembly file, and other assembly files of the same library, to be made callable through a single central initialization function which is automatically created. This allows the initialization of variables and objects to be controlled by the library. Furthermore, if the compiler arranges for de-initializer functions to be called explicitly, the de-initializer functions may also be identified from the assembly file, and other assembly files of the same library, and be made callable through a single central de-initialization function which is automatically created. This would allow the de-initialization of variables and objects to also be controlled by the library.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Exemplary embodiments of the present invention are directed to an "ASMFIX" tool which may be implemented as a computer executable program to modify an assembly file according to one or more of the procedures described in detail below.

Figure 1:
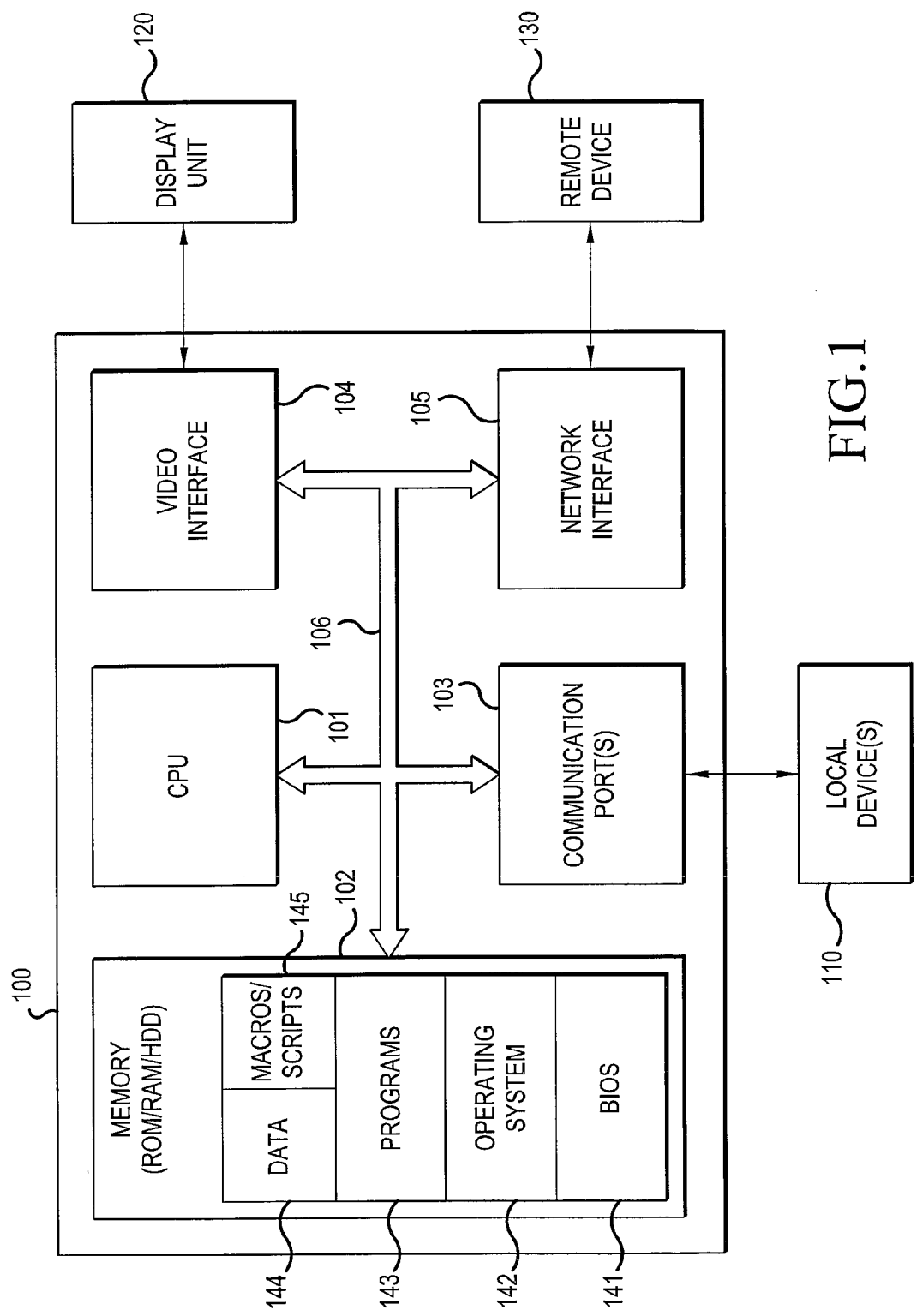
FIG. 1 is a block diagram illustrating a computing environment that can be used for implementing exemplary embodiments of the present invention.

FIG. 1 illustrates a generalized computer system 100 that can be used as an environment for implementing various aspects of the present invention. According to exemplary embodiments, it is contemplated that the computer system 100 may be implemented as any of various types of general purpose computers, including but not limited to servers, desktop computers, laptop computers, distributive computing systems, and any other type of computing devices and systems as will be contemplated by those of ordinary skill in the art.

In FIG. 1, computer system 100 has various functional components including a central processor unit (CPU) 101, memory 102, communication port(s) 103, a video interface 104, and a network interface 105. These components may be in communication with each other by way of a system bus 106.

The memory 102, which may include ROM, RAM, flash memory, hard drives, or any other combination of fixed and removable memory, stores the various software components of the system. The software components in the memory 102 may include a basic input/output system (BIOS) 141, an operating system 142, various computer programs 143 including applications and device drivers, various types of data 144, and other executable files or instructions such as macros and scripts 145.

The communication ports 103 may be connected to one or more local devices 110 such as user input devices, a printer, a media player, external memory devices, and special purpose devices such as e.g. a global positioning system receiver (GPS). Communication ports 103, which may also be referred to as input/output ports (I/O), may be any combination of such ports as USB, PS/2, RS-232, infra red (IR), Bluetooth, printer ports, or any other standardized or dedicated communication interface for local devices 110.

The video interface device 104 is connected to a display unit 120. The display unit 120 might be an integrated display. For instance, if the computer system 100 is implemented as a PDA, mobile telephone, or other small portable devices, the display will generally be an integrated display such as an LCD display. However, the display unit 120 does not have to be integrated with the other elements of the computer system 100. Instead, the display unit 120 could be implemented as a separate device, e.g., a standalone monitor.

The network interface device 105 provides the computer system 100 with the ability to connect to a network in order to communicate with a remote device 130. The communication network, which in FIG. 1 is only illustrated as the line connecting the network interface 105 with the remote device 130, may be, e.g., a local area network or the Internet. The remote device 130 may in principle be any computing device or system with similar communications capabilities as the system 100, such as a server or some other unit providing a networked service.

It will be understood that the computer system 100 illustrated in FIG. 1 is not limited to any particular configuration or embodiment regarding its size, resources, or physical implementation of components. For example, more than one of the functional components illustrated in FIG. 1 may be combined into a single integrated unit of the system 100. Also, a single functional component of FIG. 1 may be distributed over several physical units. Other units or capabilities may of course also be present. Furthermore, while it is contemplated that the system 100 may be implemented using general purpose computers or servers, various aspects of the present invention could be implemented using a system 100 with more limited processing capabilities, such as a notebook or "netbook" computer, a personal digital assistant (PDA), a cellphone or smartphone, or a set-top box system or other home-entertainment unit.

According to an exemplary embodiment, the computer system 100 may be configured as a software development environment. As such, referring again to FIG. 1, the stored computer programs 143 may include a combination of one or more software development tools for implementing such an environment. Such software development tools may include software component(s) which is necessary to compile the source code into one or more assembly files, and assemble the resultant assembly file(s) into object files (e.g., which constitute a library), which can be linked to generate usable machine code.

Also, the software development tools in the computer programs 143 of system 100 may optionally include software component(s) necessary for a user to write or author the source code to be compiled. The software development tool(s) may be specifically designed for a particular programming language. According to an exemplary embodiment the programming language may be object-based (e.g., C++). Furthermore, the software development tools of system 100 may be designed for a visual programming language (e.g., Visual C++), a diagrammatic (text-based) programming language, or both.

Figure 2:
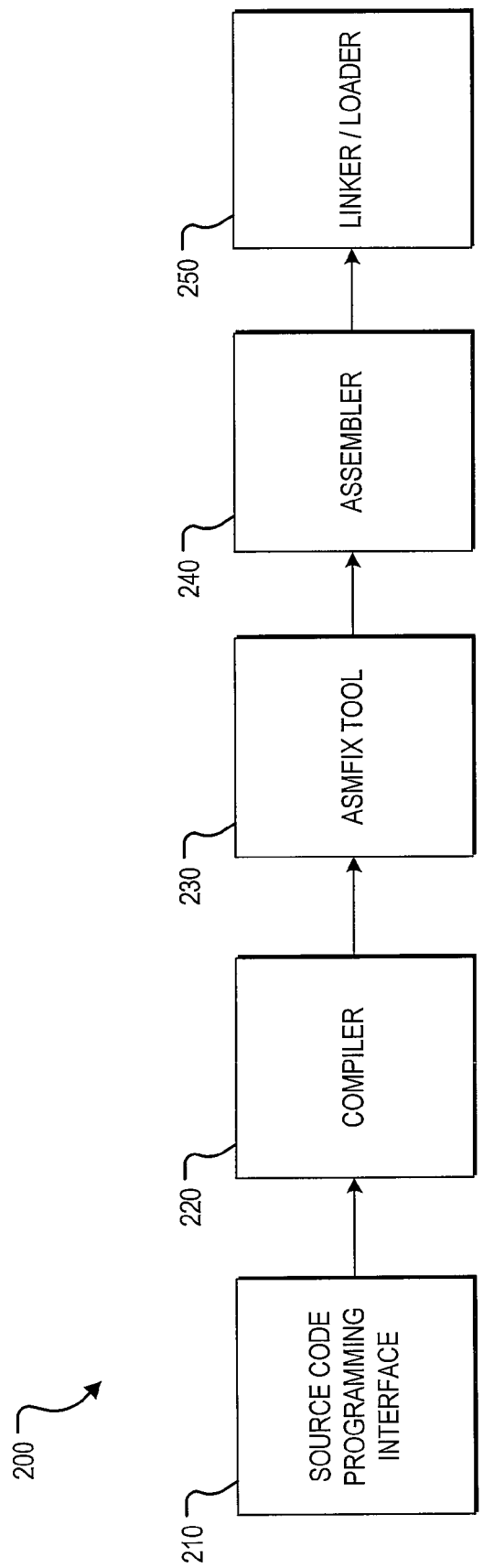
FIG. 2 is a block diagram illustrating a software development environment according to exemplary embodiments of the present invention.

FIG. 2 conceptually illustrates an example of a software development environment which may be implemented using the software development tools of a computer system 100. As shown in this figure, the software development environment 200 may include the following functional components: a source code programming interface 210, a compiler 220, an ASMFIX tool 230, an assembler 240, and a linker/loader 250. Although these components are illustrated in FIG. 2 as being part of the same environment 200, this is not intended to impose any proximity requirement, in terms of location or time, at which their respective functions are performed. For instance, execution of these functional components in accordance with the invention may span across multiple machines and platforms.

In an exemplary embodiment, the software development environment 200 may be used to produce a software library consisting of object files, e.g., to be sent to a customer using another computing platform. Alternatively, the software development environment may be used to produce an application to be delivered to the customer. The source code programming interface 210 may provide an interface for software developers to write the source code for such a library or application. The resultant source code, e.g., in C++ or another object-based programming language, is transferred to the compiler 220. The compiler 220 may be instructed or otherwise configured to create assembly files as output. As is known in the relevant art, the compiler 220 operates according to a convention or standard, often referred to as an "application binary interface" (ABI), in which certain symbols have special meaning, i.e., are defined for a specific purpose (such symbols are sometimes referred hereinbelow as "special symbols"). For instance, as will be described in further detail below, some of the special symbols defined in the application binary interface of the compiler 220 may relate to memory management functions to be implemented by the system software (e.g., the operating system or standard system libraries) of the platform on which the developed library or application is to run.

Reference has been made above to the computing platform (e.g., customer platform) where the developed library or application is to run. It is contemplated that such a platform may constitute a different computer system 100 than the software development environment 200 which is used for programming, compiling, and modifying the assembly files. However, it should be noted that the computer system 100 which is intended to run the resultant library/application may have more limited processing capabilities than the system 100 which is used for developing the library/application. Furthermore, it is also possible for the same computer system 100 acting as the software development environment 200 of FIG. 2 to be used to as the platform which runs the resultant library or application if desired. Also, as noted earlier, it is possible for some of the components illustrated in FIG. 2 to be implemented on separate computer systems 100, e.g., the linker/loader 250 may be located on the customer platform separate from the system 100 on which the compiler 220, ASMFIX tool 230, and assembler 240 are implemented.

Referring again to FIG. 2, various aspects of the present invention, which will be described in more detail below, may be implemented by the ASMFIX tool 230. In particular, the ASMFIX tool 230 may be designed to automatically inspect and modify each assembly file in accordance with the aforesaid principles. A benefit of performing such modifications at the assembly file level is that there are few restrictions imposed on what can be changed at this level, and the build environment does not have to make special provisions since the changes can be made transparent to the linking process. This is important since it may not be desirable to change anything in the build/link environment to use a specific software library or application. When an object file is assembled from an assembly files modified by the ASMFIX tool 230, it may look, for all practical purposes, just like a regular object file, and also link normally.

Referring again to FIG. 2, an assembly file modified in accordance with the ASMFIX tool 230 may be sent to an assembler 240 to be assembled into a corresponding object file. If the object files of a particular software library are output from the assembler 240, they may be linked to another application program by the linker/loader 250. In the case of generating a dynamically linked library, the majority of functionality of the linker/loader 250 may be performed by the underlying operating system in which the application program is to be loaded and run.

However, the object file(s) outputted by the assembler 240 may correspond to an application program, e.g., to be delivered to a customer. As such, linking may be performed by a linker component 250 at the developer's site, thereby generating the machine code to be delivered to the customer and loaded by the operating system of the underlying platform.

It should be noted that each of the functional components illustrated in FIG. 2 may be implemented in any combination of software, firmware, and/or hardware, as will be readily apparent to persons of ordinary skill in the art in view of this detailed description.

Figure 3:
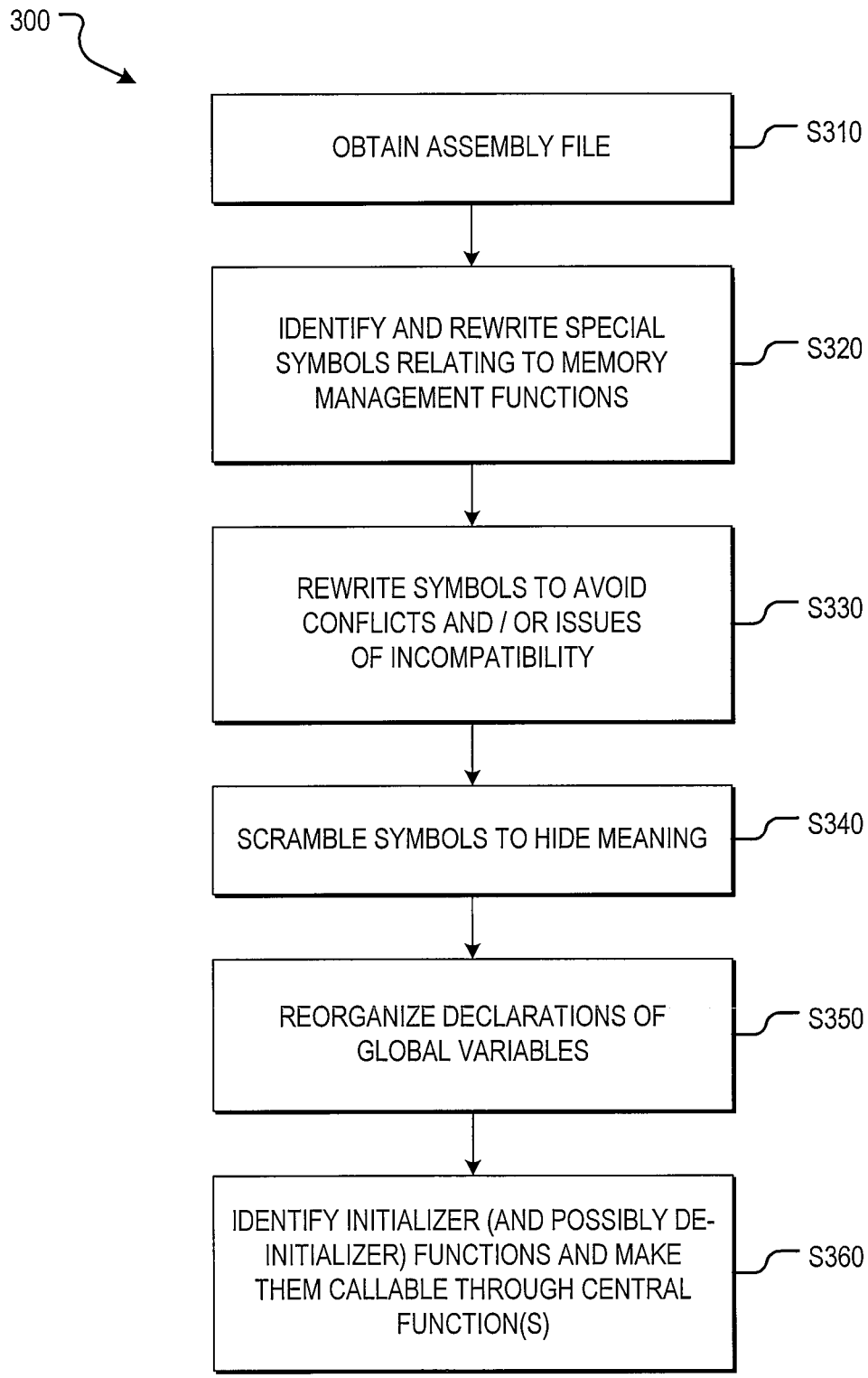
FIG. 3 is a flowchart listing various modifications which can be made to an assembly file, in accordance with exemplary embodiments of the present invention.

FIG. 3 is a flowchart illustrating various types of modification which the ASMFIX tool 230 can apply to each assembly file, according to exemplary embodiments of the present invention. Although FIG. 3 is presented as a flowchart illustrating various operations to be performed in a particular order, this is not intended to be limiting. For instance, it is not necessary to perform all operations illustrated in FIG. 3; one or more of these operations may be omitted depending on particular needs (or preferences) of those developing or using the library. Furthermore, the order of operations illustrated in FIG. 3 may be changed as will be contemplated by persons ordinarily skilled in the art.

As shown in FIG. 3, an assembly file, which is generated by the compiler 220, is obtained and applied to the ASMFIX tool 230 (operation S310). The ASMFIX tool may proceed to modify the assembly file according to one or more of the following operations:

Operation S320: Identify certain special symbols relating to memory management, as defined by the relevant application binary interface, and rewrite these symbols. This type of modification may allow a particular software library/application to use its own memory management functions without interfering with the standard memory management functions available on the underlying system software (e.g., operating system or system libraries).

Operation S330: Rewrite symbols in a particular library or application to avoid name conflicts with symbols in the application program or libraries, and/or to avoid other issues of incompatibility. An issue of incompatibility might arise with respect to a particular library to be implemented, e.g., when it is incompatible with another library shipped with the compiler and used by the controlling application program (i.e., the application to which the particular library is linked). Through the use of symbol rewriting in this instance, it would be possible for the particular library to install its own version of the otherwise incompatible library functions, while at the same time making sure that such compatible functions do not interfere with the controlling application or other libraries.

Operation S340: Scramble certain program symbols to hide their meaning. This may be performed in an effort to protect the software developer's proprietary information (e.g., names of functions, variables, and object classes in the source code). The symbols rewritten according to operation S340 may additionally be scrambled according to this operation. However, as will be explained in more detail below, certain symbols may need to be exempted from such scrambling. For instance, in the case of a software library, certain symbols may need to be visible to its controlling program and/or other support libraries, and thus, exempt from scrambling. Similarly, certain symbols in an application may need to be exempt from scrambling so that they are visible to a support library.

Operation S350: Reorganize declarations of global (non-constant) variables. Particularly, this operation may be performed in such a way that the layout and default values of some or all of the declared global variables of a particular library or application would be known prior to linking. This would allow the library or application to take control of the global variable initialization process, so all global variables used by the library could be initialized and re-initialized when needed. As an example, such reorganization may be accomplished by moving the declaration of global variables from each assembly file into a "global" assembly file.

Operation S360: Identify initializer and/or de-initializer functions. For instance, according to this operation, all initializer functions can be identified in such a manner that they can be called from a single central initialization function in the library or application. This would allow for an arrangement where the initializer functions are not called by the standard startup procedures of the operating system, but rather, is called by the library/application at will. Also, the de-initializer functions of a library/application can be identified in order to be called via a single central de-initialize function, on condition that the compiler 220 arranges for the de-initializer functions to be called explicitly.

In order to implement various modifications and operations as described above, the ASMFIX tool 230 may be tailored toward the relevant assembly language syntax, the compiler 220, and CPU-type for the software development environment 200 of the library. For instance, the ASMFIX tool 230 may need a detailed knowledge of the assembly syntax in order to identify and rewrite specific symbols relating to memory management functions according to operation S320. Further, to implement some of the other types of modifications described heretofore, the ASMFIX tool 230 might be programmed to know specifically how the compiler 220 organizes the assembly file contents into sections, how to identify the initializer and de-initializer functions, global variables, symbols to be scrambled, etc. It will be readily apparent to persons of ordinary skill in the art how to design and implement such an ASMFIX tool 230, in light of the following description of the aforementioned modifications and operations.

Figures 4, 6:
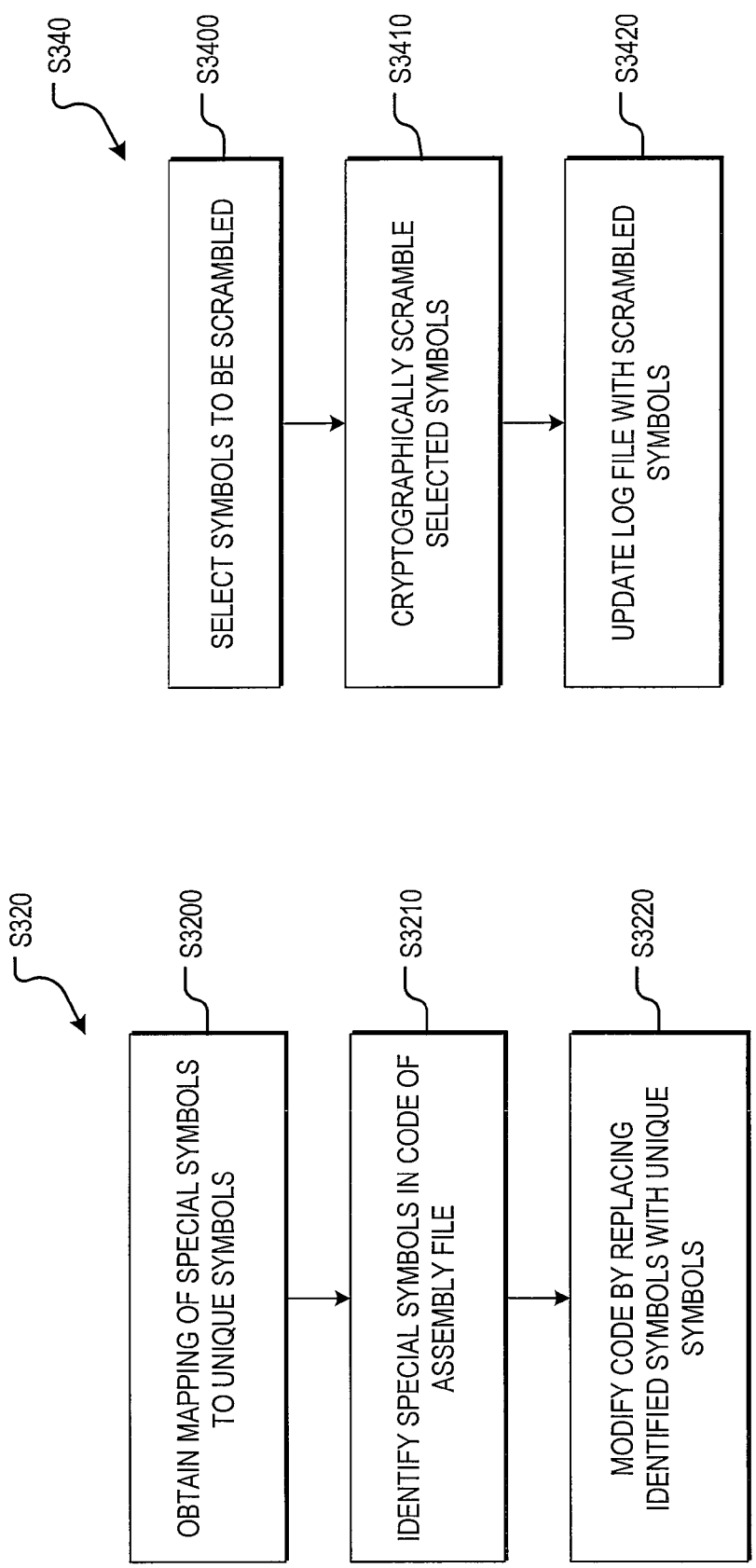
FIG. 4 is a flowchart illustrating a process for rewriting special symbols in an assembly file relating to memory management functions, according to an exemplary embodiment of the present invention.
FIG. 6 is a flowchart illustrating a process for scrambling symbols in an assembly file to hide their meaning, according to an exemplary embodiment of the present invention.

Rewriting Special Symbols (Operation S320):

FIG. 4 is a flowchart illustrating an exemplary embodiment for implementing operation S320 of FIG. 3 in order to modify an assembly file by rewriting special symbols of a particular library or application.

Depending on the particular assembly syntax in use, certain special symbols may be defined as declarations of, and calls to, certain memory management functions (e.g., global operators) in the underlying operating system which will link/load the particular library/application. According to an exemplary embodiment, at least some of these special symbols can be rewritten into symbols which do not have any special meaning to the compiler 220, system libraries or other libraries, but rather, are unique to the particular library/application and represent memory management functions that are specific to the particular library/application.

In FIG. 4, operation S3200 shows that such symbol rewriting may be controlled through a mapping between special symbols relating to memory management functions, and their replacement symbol names which are unique or specific to the particular library/application. According to an exemplary embodiment, this mapping may be designated through a configuration file which lists how the symbol rewriting should be performed. For instance, the programmer of a software library/application may create the configuration file to be input to the ASMFIX tool 230 along with the assembly files generated by the compiler 220 for implementing the library/application.

Specifically, the symbol rewriting can be accomplished via a simple mapping, e.g., in the aforementioned configuration file. For instance, in the case where symbol rewriting is to be performed for a particular software library, a configuration file may include the following statement:

_nwj Library_global_new

Thus, the above mapping could be used to rewrite the special symbol ('_nwj') into a symbol ('Library_global_new') that is specific to the particular software library (designated as "Library" for purposes of this example). In this particular example, the symbol '_nwj' is assumed to correspond to the global operator 'new,' according to the naming convention for operator 'new' as used by the relevant compiler 220.

It should be noted that the use of a configuration file to map the names of special symbols to their rewritten counterparts, in connection with S3200, is but one way in which the ASMFIX tool 230 can be controlled to determine the rewritten symbol-names. The ASMFIX tool 230 could be controlled in other ways to rewrite special symbols without departing from the spirit or scope of the invention.

Referring again to FIG. 4, in operation S3210, the code of the input assembly file is analyzed to identify the special symbol(s) to be rewritten. According to operation S3220, the code in the assembly file may be modified by replacing each identified special symbol with its mapped library-specific (or application-specific) symbol. To ensure that operation S3220 is correctly performed, the ASMFIX tool 230 may be designed to parse and check all syntax constructs in the assembly file (as well as any other assembly files for implementing the library/application) which could possibly contain the identified symbol.

Using the Library example above, the operations S3210 and S3220 may be implemented as follows. Assume that a source file in Library is written using the C++ programming language, and contains the following code:

```
// Implement Library's own 'new' operator
void* operator new(size_t size) { ...Body of operator 'new'... }
// A function allocating memory:
void* alloc10(void)
{
    return new char[10];
}
```

When this C++ file is compiled, the resulting assembly file could look something like this (only important parts included):

```
_nwj:
    ...Body of operator 'new'...
    ret
alloc10:
    move #10, r0
    jump _nwj
```

However, when the ASMFIX tool 230 identifies and rewrites the '_nwj' symbol according to operations S3210 and S3220, the relevant portion of the modified assembly file may look like:

```
Library_global_new:
    ...Body of operator 'new'...
    ret
alloc10:
    move #10, r0
    jump Library_global_new
```

According to this example, after the modified assembly file is assembled into an object file, the resultant object file does not contain any declaration of, or calls to, the allocator function of the operating system or standard libraries, where the default '_nwj' symbol is normally declared.

Figure 5:
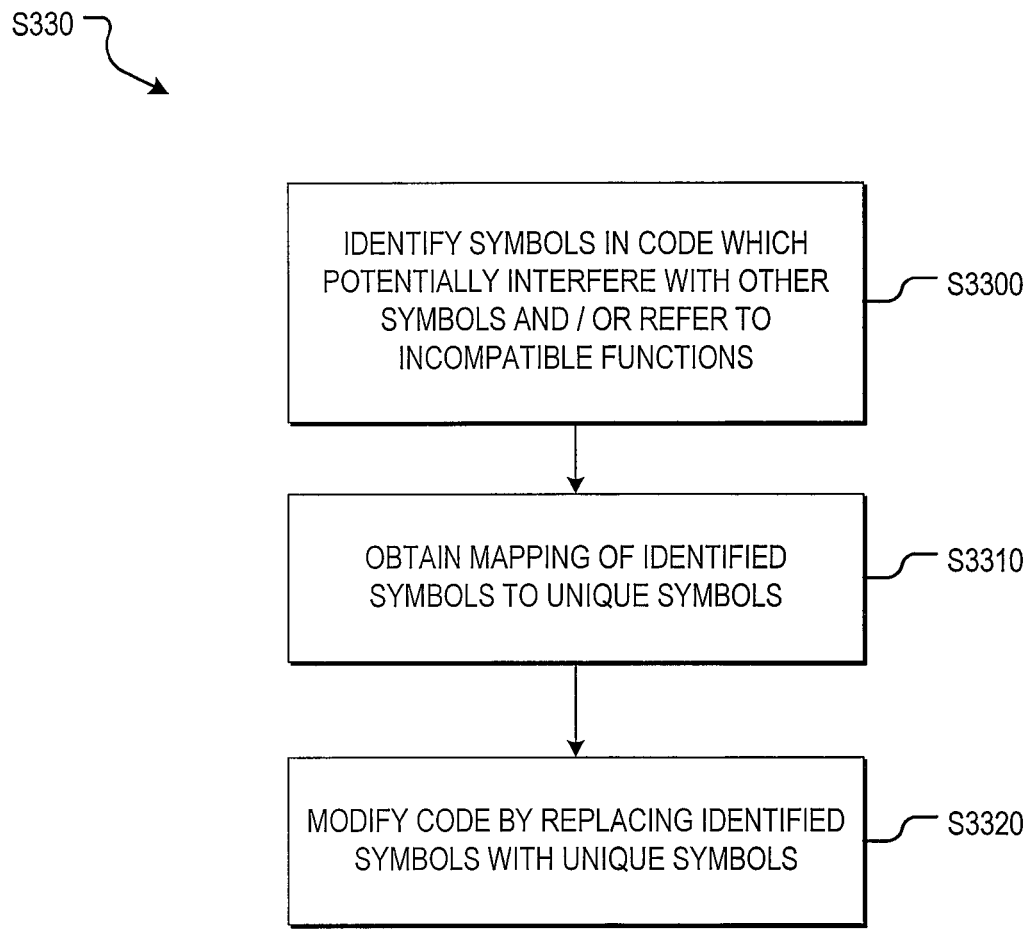
FIG. 5 is a flowchart illustrating a process for rewriting symbols to avoid name clashes with symbols in other software, and/or avoid the use of incompatible functions, according to an exemplary embodiment of the present invention.

Rewriting Symbols with Conflicts or Incompatibilities (Operation S330):

In FIG. 3, operation S330 shows that the ASMFIX tool 230 may be used to identify and rewrite symbols in the assembly file which implements part of a particular library or application, in order to avoid symbol-name clashes with other software installed on the underlying platform, and/or to prevent the library/application from calling incompatible functions. FIG. 5 is a flowchart illustrating an exemplary embodiment for implementing operation S330 of FIG. 3.

According to operation S3300 of FIG. 5, the ASMFIX tool 230 identifies symbols in the assembly file to be rewritten, e.g., those symbols which potentially have the same name as symbols in other software and/or those symbols which might be used to call functions (e.g., in the system software) which are incompatible with the particular library or application being developed.

The actual way of determining which symbols in a particular library/application might conflict with other symbol names, or result in calls to incompatible functions, is outside the scope of this detailed description. Suffice it to say that such determination may be made in any manner as would be contemplated by persons of ordinary skill in the art.

According to operation S3310 of FIG. 5, the ASMFIX tool 230 may be controlled to rewrite the symbols, which are identified in S3300, through the use of a mapping between the identified symbols and the replacement symbol names. For instance, similar to operation S3200 of FIG. 4 described above, such mapping may be specified by a configuration file which is input to the ASMFIX tool 230 along with the assembly files for implementing the library/application. However, other ways of controlling the ASMFIX tool 230 to rename the identified symbols may be used as well.

According to operation S3320 of FIG. 5, the ASMFIX tool 230 modifies the code of the assembly file by replacing all instances of the identified symbols with their renamed counterparts.

Symbol Scrambling (Operation S340):

Referring again to FIG. 3, the ASMFIX tool 230 may be configured to scramble or modify one or more symbols within an input assembly file to hide their meaning, as illustrated in operation S340. According to an exemplary embodiment, such symbol scrambling may be performed based on a cryptographic hash.

FIG. 6 is a flowchart illustrating an exemplary embodiment for implementing operation S340 of FIG. 3 in order to modify an assembly file by scrambling one or more symbols to hide their meaning.

According to operation S3400 of FIG. 6, a selection is made as to which symbols are to be scrambled. For instance, in order to be able to call a specific library's functions, it would be necessary for some symbols to be exempted from scrambling in the assembly file. Particularly, some symbols in a specific library may be part of that library's application programming interface (API) and thus needs to be made visible to the controlling application to which the specific library is linked. Also, there may be symbols in a particular library or application which are the names of resources in system libraries, other supporting libraries, or the controlling application with which the particular library/application needs to interact. If such symbols were scrambled, this might prevent the particular library or application from referring to functionality it needs. As an example, when a symbol which is the name of standard functionality like the C/C++ "strlen" function, which is typically implemented in a system library, this symbol should be excluded from scrambling.

The determination of which symbols should and should not be scrambled may be accomplished through the use of a separate configuration file. In fact, if the symbol rewriting (S320) of FIG. 4 is also performed, it is contemplated that the same configuration file could be used both for mapping symbols to rewritten symbols (operation S3200), and for identifying which symbols should be selected for (or exempt from) scrambling (operation S3400).

According to operation S3410 of FIG. 6, the selected symbols are cryptographically scrambled. This may accomplished by any cryptographic process as contemplated by persons of ordinary skill in the art, e.g., based on a cryptographic hash. If a cryptographic hash is used, e.g., each scrambled symbol might be the result of computing the hash value of the unscrambled symbol name and some secret information that is only known to those who perform the scrambling. To perform symbol scrambling correctly, the ASMFIX tool 230 may be need to parse and check every syntax construct in the assembly file (and the other assembly files in the same library) which could possibly contain the selected symbols, to ensure that all instances of such symbols in the assembly file code is replaced with their scrambled counterparts.

According to operation S3420 in FIG. 6, a log file may be kept recording each scrambled symbol in the modified assembly file. This could help avoid name-clashes between scrambled symbols, or between a scrambled and unscrambled symbol. Also, the log file may also be used to map the scrambled symbols to their original unscrambled counterparts. As such, the log file may be used to translate each scrambled symbol into its original unscrambled form. This makes it possible to decipher call-stacks, etc., that contain scrambled symbols.

For instance, each time a symbol is scrambled according to S3410, the log file may be checked to determine whether the scrambling results in a name-collision or conflict with another symbol. In particular, it is possible that two different symbols could be scrambled in such a manner that the respective scrambled symbols are the same (this might be referred to as a "hash collision" if a cryptographic hash is used). An analysis of the log file could detect such a name conflict between scrambled symbols (e.g., hash collision) by checking all the scrambled symbols which are recorded in the log file for different symbols, in an effort to find duplicates. However, when a strong cryptographic hash function is used, such hash collisions become very unlikely. As such, the ASM-FIX tool 230 might simply be programmed to output an error message in the unlikely event that a check of the log file finds a hash conflict, to prevent incorrect operation.

It should be noted that symbols, which were previously rewritten according to S320 of FIG. 3, can additionally be scrambled according to the process described above. For instance, in the example described above in connection with FIG. 4, the rewritten symbol 'Library_global_new,' as well as the symbol 'alloc10,' may be scrambled in order to hide its meaning according to the process of FIG. 6.

Reorganize Declarations of Global Variables (S350):

Referring again to FIG. 3, operation S350 shows that the ASMFIX tool 230 may be used for reorganizing the declaration of global variables in a particular library or application. Specifically, this operation S350 can be performed in such a manner that the exact layout and default values of each declared global variable in the library/application is known prior to linking. As such, the ASMFIX tool 230 may generate a special "global data" assembly file for the library/application which holds all the declared global variables of the library/application in a layout that the linker 250 will not change.

Figure 7:
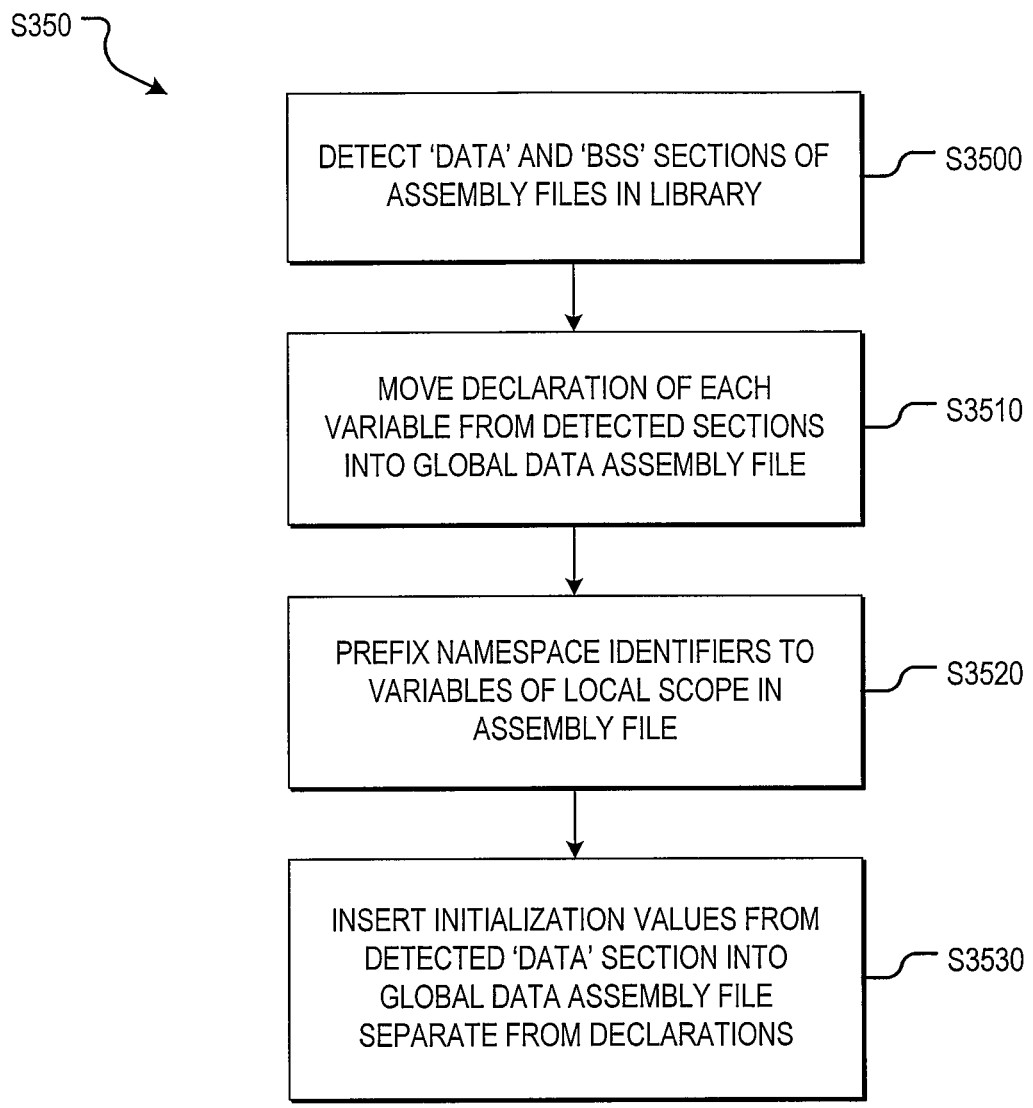
FIG. 7 is a flowchart illustrating a process for reorganizing the global variables, which are declared in the assembly files of a particular library, according to an exemplary embodiment of the present invention.

When this modification is performed on the assembly files for implementing a software library, this has the benefit of allowing the software library to be called on (e.g., by an application program to which it is linked) to control its global variable initialization process (i.e., initialize and re-initialize the global variables when needed) without relying on or being forced by the standard startup procedure for the linked application program. In a similar vein, if such modification were to be performed on assembly files for implementing an application, the application can be programmed to control the initialization process for its global variables. FIG. 7 is a flowchart illustrating an exemplary process for reorganizing the global variables of a library/application as described above.

Typically, global variables can be identified by detecting the 'data' and 'bss' segments in an assembly file. The term 'bss' is a label for memory which is expected to be initialized to all zero bytes as part of the initialization process, while the term 'data' is a label for memory that is expected to be initialized to a designated (possibly non-zero) value during initialization. Accordingly, variables which are declared in the 'data' section of an assembly file are typically initialized to some predefined values, while variables declared in a 'bss' segment are typically initialized to zero. Take for example an assembly file containing the following 'bss' and 'data' sections:

```
section bss
scratch_data:
    size 1024
section data
default_answer:
    dcl 42
```

In the example assembly file above, the 'bss' segment holds read-write data which needs to be initialized to zero, while the 'data' segment holds read-write data that needs to be initialized to a given value (possibly non-zero). The symbols of the above assembly file are identifiable as having a ':' (colon) after the symbol-name. Furthermore, the 'size' directive shown above reserves the specified number of bytes in the corresponding object file. Also, the 'dcl' directive means "declare long" which, in this example, is a 32-bit word (4 bytes). The value of the 32-bit word is listed after the 'dcl' directive, such value being placed into the object file at the given position.

When assembly files, such as the above, are assembled into object files and sent to a linker program, the linker will arrange all 'bss' symbols together somewhere in memory, and all 'data' symbols together somewhere else in memory. However, it is impossible to know beforehand how the 'bss' and 'data' sections of various object files, e.g., of different libraries, will be arranged by the linker. Accordingly, to ensure that a particular library's data/bss symbols are placed together in a particular order, the linker has to be prevented from deciding the layout of the library's global variables.

Thus, according to operations S3500 and S3510 of FIG. 7, the ASMFIX tool 230 detects the 'data' and 'bss' sections from the regular assembly files of a particular library, removes the declaration of each variable in the detected 'data' and 'bss' sections, and inserts the declarations of the variables into a special global data assembly file. Particularly, these variable declarations may be placed in a single segment declaration ('data' or 'bss') of the global data assembly file. By doing this, when the library object files are sent to a linker (e.g., the linker/loader 250 of FIG. 2), the linker will not be allowed to rearrange the declaration of these variables.

In moving the declaration of variables according to S3510, the ASMFIX tool 230 should be designed to make such variables accessible from their original assembly files (they may have to be explicitly imported and exported, depending on the assembly syntax).

Furthermore, it would be advantageous to design the ASM-FIX tool 230 so that each variable of the library, which had local scope in the assembly file where it was originally declared, does not interfere with symbols elsewhere (i.e., outside the assembly file where it was originally declared). Thus, according to operation S3529 of FIG. 7, each variable whose scope is local to the assembly file in which it was originally declared may be prefixed with a "namespace identifier" string which is unique to that assembly file. Of course, the names of such variables may be modified in other ways to ensure that they do not interfere with symbols outside their original scope, as will be contemplated by those of ordinary skill in the art.

According to an exemplary embodiment, the declarations of both variables to be initialized to zero ('bss' symbols) and variables to be initialized to non-zero values ('data' symbols) may be moved into a single 'bss' segment of the global data assembly file. Accordingly, the non-zero initialization values from the detected 'data' sections of the original assembly files will need to be inserted in a section of the global data assembly file that is separate from the variable declarations, according to operation S3530 of FIG. 7. By having the initial values of the global variables placed outside the global variables themselves, they will remain unchanged and can be used for re-initializing the global variables over and over. The initial values may be placed in read-only portion of the memory, if the system allows.

For instance, in operation S3530, the non-zero initialization values may be copied from the various 'data' sections of the original assembly files and copied into a 'text' section of the global data assembly file. As a specific example of this will be described using the following 'bss' and 'data' segments of an assembly file:

```
            section bss
         scratch_data:
            size 1024
         section data
         default_answer:
            dcl 42
```

Assume that the ASMFIX tool 230 receives the above assembly file as part of the same library or application as other assembly files declaring 'other_info' as a 16-byte variable/object, and 'other_pointer' as a pointer that is initialized to point to the 'other info' variable. If the ASMFIX tool 230 were to reorganize the declaration of global variables of such assembly files according to FIG. 6, this could result in the following global data assembly file:

```
            section bss
         begin_special_bss_section:
         scratch_buffer:
            size 1024
         other_info:
            size 16
         end_special_bss_section:
            section bss
         begin_special_data_area:
         default_answer:
            size 4   ; To hold the 'dcl 42' declaration
         other_pointer:
            size 4   ; To hold the 'dcl other_info'
         declaration
         end_special_data_area:
            section text
         begin_special_data_init_values:
            dcl 42
            dcl other_info
         end_special_data_init_values:
```

It should be noted that the 'text' section of an assembly file, as illustrated above, is a section where the data may be read-only and thus cannot be changed.

In the example above, the global variables have been placed in the 'bss' segment of the global data assembly file, according to operation S3510, where they are designated for initialization either to zero (the first 'bss' section) or have initial values copied from the template in the 'text' segment (for the second 'bss' section). The template in the 'text' segment is where the initial values of the (possibly non-zero) global variables have been inserted, according to operation S3530. This would allow the library or application to be programmed to initialize the global variables by copying everything between 'begin_special_data init_values' and 'end_special_data_init_values' into 'begin_special_data_area,' and initializing everything between 'begin_special_bss_section and 'end_special_bss_section' to zero. However, it is important to keep the order of the variables and sizes of the variables consistent in the 'text' and 'bss' segments of the global data assembly file, or else variables could get the wrong values during global variable initialization.

Please note that the term "variable," as used heretofore and hereinafter, is intended to cover all types of identifiable data-storing structures, including objects.

Identify and Collect Initializer and De-Initializer Functions (Operation S360):

As set forth in operation S360 of FIG. 3, the ASMFIX tool 230 may be configured to identify all initializer and/or de-initializer functions from the assembly files of a particular library or application.

However, as mentioned above, the identification of de-initializer functions according to this operation should be made conditional on whether the compiler 220 has explicitly arranged for the de-initializer functions to be called explicitly (by producing an explicit list of the de-initializers to be called). In the case where de-initializers are not arranged by the compiler 220 to be called explicitly, the de-initializer functions are typical registered dynamically into a system facility during system initialization, in such a manner that the de-initializer functions are called upon termination of the relevant application. In the case of dynamic registration, the de-initializer functions do not need to be collected according to operation S360 of FIG. 3; instead, the particular library or application may be adapted to implement the dynamic registration function locally (in such a manner that it does not conflict with the underlying system facility for dynamic registration). The local implementation of the dynamic registration functionality within the particular library/application can call on the dynamically registered de-initializers at will, i.e., when the global variables and objects are no longer needed.

Figure 8:
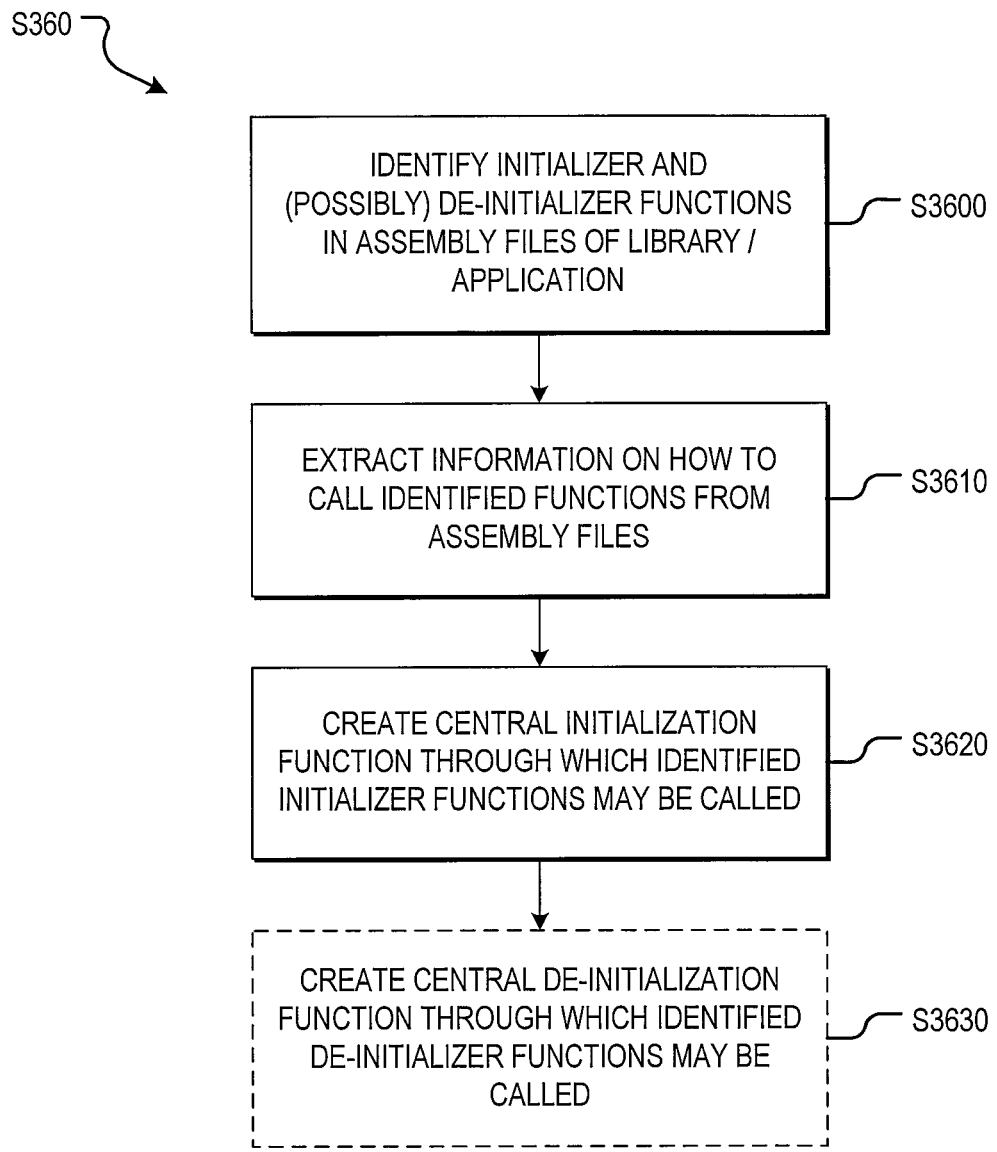
FIG. 8 is a flowchart illustrating a process for processing the assembly files of a library or application by identifying their initializer and (possibly) de-initializer functions and making them callable through a central initialization function and de-initialization function, respectively, according to an exemplary embodiment of the present invention.

FIG. 8 is a flowchart illustrating an exemplary embodiment for modifying the assembly files of a particular library/application by identifying and collecting their initializer (and possibly de-initializer functions) according to operation S360 of FIG. 3.

According to operation S3600 of FIG. 8, the assembly files of a library may be analyzed to identify the initializer functions contained therein, and possibly the de-initializer functions contained therein (conditioned on whether the de-initializers are to be called explicitly). According to operation S3610, information as to how the identified initializer (and possibly de-initializer) functions may be extracted from the assembly files so that the system software (e.g., standard system libraries) will be unable to call these functions during standard startup/shutdown procedures. The identified initializer functions may be called from a single central initialization function (entry point) that is generated by the ASMFIX tool 230 according to operation S3620. Furthermore, if applicable, the identified de-initializer functions may also be called from a single central de-initialization function (entry point) that is generated by the ASMFIX tool 230 according to operation S3630 (since this operation is conditional, block S3630 in FIG. 8 is illustrated by dotted lines).

In view of this modification, the ASMFIX tool 230 may arrange it so that the initializer (and possibly de-initializer) functions are not called during the operating system's standard application startup and shutdown procedures, respectively. Instead, the initializer functions can be called by the library at will through a single entry point, and if applicable, the de-initializer functions through another single entry point.

An example will now be described as to how initializer and de-initializer functions can be detected from an assembly file in accordance with operation S3600. In this example, an assembly file contains the following sections:

```
            section ctors
               dcl _static_init
            section dtors
               dcl _static_deinit
            section text
         _static_init:
               ...Initialize instructions...
               ret
         _static_deinit:
               ...De-initialize instructions...
               ret
```

In the assembly file of the above example, the sections 'ctors' and 'dtors' are special sections which are used to hold pointers to all "constructors" and "destructors" (names typically used in C++). In this example, the symbol '_static_init' represents the name of one static initializer function, while '_static_deinit' represents the name of one static de-initializer function. Such symbols are created as a result of a compiler (e.g., compiler 220 of FIG. 2) deciding that initialization and de-initialization, respectively, are needed. Typically, the functions '_static_init' and '_static_deinit' would be implemented by such compiler locally in the file where they are needed (where the global variables/objects requiring initialization or de-initialization are located).

In order to perform standard startup and shutdown procedures, respectively, the system software will typically analyze the 'ctors' and 'dtors' sections, and call the initializer and de-initializer functions listed therein, respectively, to perform initialization and possibly de-initialization.

Thus, information can be extracted by the ASMFIX tool 230 from such an assembly file in order to prevent the system software from attempting to call the initializer/de-initializer functions during the standard startup/shutdown procedures, in accordance with operation S3610. Specifically, the ASMFIX tool 230 can do this by removing the ctors' and 'dtors' sections from the assembly file. Specifically, in reference to the example given above, the ASMFIX tool 230 can rewrite the above sections of the assembly file as follows:

```
section text
    _static_init_namespace_id_1:
        ...Initialize instructions...
        ret
    _static_deinit_namespace_id_1:
        ...De-initialize instructions...
        ret
        export _static_init_namespace_id_1
        export _static_deinit_namespace_id_1
```

It should be noted that the 'ctors' and 'dtors' sections have been removed from the assembly file by the ASMFIX tool 230 in this example. Thus, the system software, e.g., standard system libraries, will no longer call the initializers and de-initializers; this is now the responsibility of the particular library or application of which the assembly file is a part. Furthermore, as shown in this example, the symbols for the initializer and de-initializer functions are exported so that they are visible outside of their originating assembly file. As such, the names of the initializer and de-initializer functions may be rewritten by the ASMFIX tool 230 to include a namespace identifier ('_namespace_id_1' in this example) unique to their originating assembly file, according to an exemplary embodiment. As described above in connection with S3520 of FIG. 7, such a namespace identifier can help prevent the symbols from interfering with other symbols outside the scope of the assembly file.

As shown in operation S3620 of FIG. 8, the identified initializer functions of multiple assembly files for a particular library or application may be assembled into a single entry point. Similarly, operation S3630 shows that, if applicable, the identified de-initializer functions of multiple assembly files may be assembled into a single entry point. In an exemplary embodiment, the respective entry points of the initializer and de-initializer functions may be placed in a central assembly file created by the ASMFIX tool 230. Specifically, referring again to the above example, the ASMFIX tool 230 could create an assembly file containing something like the following:

```
section text
    call_Library_initializers:
        call _static_init_namespace_id_1
        call _static_init_namespace_id_2
        ...
        call _static_init_namespace_id_x
        ret
    call_Library_deinitializers:
        call _static_deinit_namespace_id_x
        ...
        call _static_deinit_namespace_id_2
        call _static_deinit_namespace_id_1
        ret
```

In this example, the ASMFIX tool 230 has created the entry point for the initializer functions as 'call Library_initializers,' and the entry point for the de-initializer functions as 'call Library_deinitializers' (note: this example assumes that the original assembly files are part of a software library designated as "Library"). Here, the namespace identifiers '_namespace_id_x' are used to differentiate initializer/de-initializer functions located in different assembly files, so that there are no symbol-name conflicts. Accordingly, the ASMFIX tool 230 has rewritten the symbol '_static_init,' which is for the assembly file in Library corresponding to x, into '_static_init_namespace_x'; and similarly has rewritten the symbol '_static_deinit' for the same assembly file into '_static_init_namespace_x.' This ensures that all initializers and de-initializers are uniquely named across the collection of assembly files in Library.

It is further noted in the above example that the assembly file, which is created by the ASMFIX tool 230, calls the de-initializers in the reverse order in which the initializers are called. This may be necessitated, e.g., by the C++ specification.

The above example is for the situation where operation S360 is performed by the ASMFIX tool 230 to collect both the initializer functions and de-initializer functions into respective single entry points. However, as mentioned above, it is possible that the compiler 220 might not explicitly arrange for the de-initializer functions of the assembly files to be called explicitly (i.e., the compiler 220 does not produce an explicit list of the de-initializers to be called), in which case the de-initializer functions would not be assembled into a single entry point according to S3630. However, in this instance, the ASMFIX tool 230 could still be used to modify the assembly files so that the corresponding library/application can control termination.

Consider an example where the compiler 220 does not produce explicitly arrange for the de-initializers to be called explicitly. In this case, the compiler 220 might produce something like the following:

```
section ctors
    dcl _static_init
section text
    _static_init:
        ...Initialize instructions...
        move #_static_deinit, r0
        call _cxa_atexit
        ret
    _static_deinit:
        ...De-initialize instructions...
        ret
```

In this example, like the previous, the 'ctors' section still contains pointers to each initializer that need to be called. However, the initializer function registers de-initializer function to be called before it terminates, through a call to '_cxa_atexit' method in the above example. This prompts the "at-exit" method in the system software to register a function that is to be called upon termination of the application.

In this situation, the ASMFIX tool 230 may used to allow the corresponding library or application to control its own termination, by modifying the assembly files. According to an exemplary embodiment, the ASMFIX tool 230 can do this by replacing the call to the '_cxa_atexit' method with a call to an "at-exit" management function in the library/application itself This can be accomplished in the above example by rewriting the symbol '_cxa_atexit' into, e.g., 'Library_cxa_atexit' (assuming that the assembly files are for implementing a library designated as "Library"). The "at-exit" management function of the library/application would take (at least) one argument, which is the address of the function to be called upon termination (i.e., at exit) of the library/application. In such an embodiment, the compiler 220 may arrange for the initializer function to register its corresponding de-initialization function.

When implementing the "at-exit" management function of the library/application, a function similar to the earlier-described 'call Library_intializers' should be provided, which goes through the previously dynamically registered pointers for the respective de-initializer functions of the assembly files, and calls these functions. In doing this, it might be necessary to call the registered de-initializer functions in reverse order of registration, e.g., for C++ compliance.

As described above in connection with FIG. 8, the ASM-FIX tool 230 of the present invention can be designed to modify the assembly files of a particular library or application so that the initializer functions contained therein can be assembled into a single entry point. This can be particularly advantageous for a software library because, by creating a single entry point for the initializer functions in the library, the library can be called on by an application program to initialize all of the global memory it uses at will, without relying on or being forced by a standard startup procedure of the operating system. However, the library still has the option of initializing memory and calling its initializers on standard startup and/or standard shutdown of its corresponding application program.

Furthermore, as described above, the ASMFIX tool 230 may be used to modify the assembly files of a library or application so that the library/application can control the calls to its de-initializer functions. This can provide an efficient mechanism for calling the de-initializer functions (and effectively terminating the library/application) when the global variables or objects are no longer needed. Furthermore, in the particular case where a software library is implemented by the assembly files, this feature allows the library to be effectively exited even though the controlling application program, to which the library is linked, is still running. Examples of an application program which may continue to run, after its linked library has effectively exited, includes but is not limited to: user interfaces, glue-code for operating system functions, timers, event-notifiers, etc., which are either a monolithically linked program containing the entire runtime environment, or a single program started and stopped by the operating system.

In fact, a library which has effectively been exited in the aforementioned manner, i.e., while its controlling application program continues to run, may be able to repeat the initialization of its global variables and the calling of the initializer functions via the entry point to effectively launch the library a second time, even if the controlling application has not been terminated in the meantime. To allow this, the library might have to explicitly release all resources acquired dynamically from the operating system or application program before or while running the de-initializer functions. This is because a forced release of resources does not generally happen upon an "exit" of the library, and a re-initialization might cause previous references to operating system resources to be lost (with some exceptions as described below).

In a further exemplary embodiment, not all global variables of a particular library or application need to be governed by the library/application in the manner described above in connection with FIG. 8. As such, operation S3600 may be modified so that not all initializer and de-initializer functions are identified to be extracted and assembled into the respective entry points. Certain exceptions may be granted, e.g., through the use of a configuration file. Exceptions may be granted for certain global variables which are preferably not be governed by the library, e.g., so that they can keep their values from one startup/shutdown cycle to the next. This could be useful for, e.g., event logging, keeping handles on operating system resources that can't or shouldn't be released and re-acquired, etc.

With particular embodiments being described above for purposes of example, the present invention covers any and all obvious variations as would be readily contemplated by those of ordinary skill in the art.

What is claimed is:

1. A method for avoiding naming conflicts while allowing a linked software library to be called on without reliance on a standard startup procedure for the application program to which the library is linked, comprising:
   utilizing a computer processor to obtain an assembly file generated by a compiler for the library;
   identify certain special symbols in the code of the assembly file which relate to memory management, and rewrite the identified symbols in the code to allow the use of the library's memory management functions without interfering with standard memory management functions available on an underlying operating system and system libraries;
   modifying the code in the assembly file to avoid a name collision, which would otherwise occur when a function, variable, or object class in the library has a same name as another function, variable, or object class in a different library or application loaded when linked in an operating system, by performing at least one of the following:
      rewrite one or more symbols in the code related to the name of a function, variable, or object class, and
      scramble one or more symbols in the code related to the name of a function, variable, or object class; and
   removing the declaration of one or more global variables from the modified assembly file, the removed declaration being inserted into a global assembly file.

2. The method of claim 1, further comprising assembling the modified assembly file into an object file.

3. The method of claim 1, the assembly file being created according to an application binary interface, wherein the computer processor is utilized to modify the code by rewriting a first symbol, which represents a memory management function according to the application binary interface, into a second symbol not having a specific meaning within the application binary interface.

4. The method of claim 3, wherein
   the assembly file is created as a result of compiling code for a specific software library,
   the first symbol represents a memory management function implemented by an operating system, and the second symbol represents a memory management function implemented by the specific software library.

5. The method of claim 1, wherein the computer processor is utilized to modify the code by scrambling a symbol using a cryptographic hash, and creates a log correlating the scrambled symbol to the unscrambled symbol.

6. The method of claim 5, wherein the log file is used for at least one of: translating between the scrambled and unscrambled symbols, and checking for hash collisions among scrambled symbols.

7. The method of claim 1, wherein the computer processor is utilized to modify the code by removing the declaration of one or more global variables, and inserting the removed declaration into another assembly file, said removing and inserting being accomplished by:
   detecting a first segment in the assembly file referring to memory to be initialized to zero during initialization;
   detecting a second segment in the assembly file referring to memory to be initialized to a designated value during initialization;
   moving a declaration of a variable from the detected first or second segment into a global data assembly file.

8. The method of claim 7, wherein a declaration of a variable of local scope in the assembly file is moved from the detected first or second segment into the global data assembly file, the variable of local scope being prefixed with a namespace identifier corresponding to the assembly file as the declaration is moved into the global data assembly file.

9. The method of claim 7, wherein a declaration of a global variable is moved from the detected second segment into a first section of the global data assembly file, the method further utilizing the computer processor to move the designated value for the global variable from the detected second segment into a second section of the global data assembly file separate from the first section, the global variable being initialized by copying the designated value from the second section into the first section.

10. The method of claim 1, wherein the assembly file is one of a plurality of assembly files created as a result of compiling code for a specific software library, the method further comprising utilizing the computer processor to:
   identify a plurality of initializer functions in the plurality of assembly files; and
   make the identified initializer functions callable through a single initialization function in the specific software library.

11. A non-transitory computer-readable storage medium on which is stored instructions which, when executed by a computer, causes the computer to perform the method of claim 1.

12. A system for avoiding naming conflicts while allowing a linked software library to be called on without reliance on a standard startup procedure for the application program to which the library is linked comprising:
   a computer processor programmed to:
      obtain an assembly file generated by a compiler;
      identify certain special symbols in the code of the assembly file which relate to memory management, and rewrite the identified symbols in the code to allow the use of the library's memory management functions without interfering with standard memory management functions available on an underlying operating system and system libraries;
      modify the code in the assembly file to avoid a name collision, which would otherwise occur when a function, variable, or object class in the library has a same name as another function, variable, or object class in a different library or application loaded when linked in an operating system, by performing at least one of the following:
         rewrite one or more symbols in the code related to the name of a function, variable, or object class, and scramble one or more symbols in the code related to the name of a function, variable, or object class; and
         remove the declaration of one or more global variables from the modified assembly file, the removed declaration being inserted into a global assembly file.

13. The system of claim 12, the assembly file being created according to an application binary interface, wherein the computer processor is programmed to modify the code by rewriting a first symbol, which represents a memory management function according to the application binary interface, into a second symbol not having a specific meaning within the application binary interface.

14. The system of claim 13, wherein
   the assembly file is created as a result of compiling code for a specific software library,
   the first symbol represents a memory management function implemented by an operating system, and
   the second symbol represents a memory management function implemented by the specific software library.

15. The system of claim 12, wherein the computer processor is programmed to modify the code by scrambling a symbol using a cryptographic hash, and creates a log correlating the scrambled symbol to the unscrambled symbol.

16. The system of claim 15, wherein the system uses the log file for at least one of: translating between the scrambled and unscrambled symbols, and checking for hash collisions between the scrambled symbols.

17. The system of claim 12, wherein the computer processor is programmed to modify the code by removing the declaration of one or more global variables, and inserting the removed declaration into another assembly file, said removing and inserting being accomplished by:
   detecting a first segment in the assembly file referring to memory to be initialized to zero during initialization;
   detecting a second segment in the assembly file referring to memory to be initialized to a designated value during initialization;
   moving a declaration of a variable from the detected first or second segment into a global data assembly file.

18. The system of claim 17, wherein computer processor is programmed to move the declaration of a variable with local scope from the detected first or second segment into the global data assembly file, the computer processor is further programmed to prefix the variable of local scope with a namespace identifier corresponding to the assembly file as the declaration is moved into the global data assembly file.

19. The system of claim 17, wherein the computer processor is programmed to move the declaration of a global variable from the detected second segment into a first section of the global data assembly file, the computer processor further being programmed to move the designated value for the global variable from the detected second segment into a second section of the global data assembly file separate from the first section, the global variable being initialized by copying the designated value from the second section into the first section.

20. The system of claim 12, wherein the assembly file is one of a plurality of assembly files created as a result of compiling code for a specific software library, the computer processor further being programmed to:
   identify a plurality of initializer functions in the plurality of assembly files; and make the identified initializer functions callable through a single initialization function in the specific software library.

* * * * *